(12) United States Patent
Sacca et al.

(10) Patent No.: US 6,519,339 B1
(45) Date of Patent: Feb. 11, 2003

(54) METHOD OF REGULATING POWER TRANSFER ACROSS AN ISOLATION BARRIER

(75) Inventors: Frank Sacca, Diamond Bar, CA (US); James Bunde Villadsen Skov, Laguna Niguel, CA (US); Mounir Ayoub, Orange, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/534,673

(22) Filed: Mar. 24, 2000

Related U.S. Application Data

(63) Continuation-in-part of application No. 09/408,615, filed on Sep. 30, 1999
(60) Provisional application No. 60/131,897, filed on Apr. 30, 1999, and provisional application No. 60/147,293, filed on Aug. 4, 1999.

(51) Int. Cl.$^7$ ................................................ H04M 1/00
(52) U.S. Cl. ............. 379/412; 379/387.01; 379/390.03; 379/399.01; 379/401
(58) Field of Search ................................ 379/412, 399, 379/411, 413, 93.05, 93.06, 93.29, 406, 399.01, 401, 387.01, 390.03

(56) References Cited

U.S. PATENT DOCUMENTS

| | | |
|---|---|---|
| 3,714,540 A | 1/1973 | Galloway ........................ 321/2 |
| 4,192,978 A | 3/1980 | Vincent ....................... 379/405 |
| 4,540,854 A | 9/1985 | Beirne ......................... 379/345 |
| 4,608,541 A | 8/1986 | Moriwaki et al. ............. 330/10 |
| 4,644,526 A | 2/1987 | Wu ............................. 370/295 |
| 4,723,267 A | 2/1988 | Jones et al. ............... 379/93.05 |
| 4,741,031 A | 4/1988 | Grandstaff ................... 379/375 |
| 4,757,528 A | 7/1988 | Falater et al. ................ 379/412 |

(List continued on next page.)

FOREIGN PATENT DOCUMENTS

EP  0 576 882 A  1/1994  ............ H02H/3/00

OTHER PUBLICATIONS

Silcon Laboratories, *Direct Digital Access Arrangement (DDAA)*, Si3032, pp. 1–28.

(List continued on next page.)

*Primary Examiner*—Fan Tsang
*Assistant Examiner*—Ovidio Escalante
(74) *Attorney, Agent, or Firm*—Akin Gump Strauss Hauer & Feld, LLP

(57) ABSTRACT

An efficient method and circuitry for transferring various levels of power across a high voltage isolation barrier. In one embodiment of the invention, a data access arrangement (DAA) is provided with system side circuitry that provides power to line side circuitry via the high voltage isolation barrier. The line side circuitry includes voltage measurement circuitry, such as an analog-to-digital converter, that periodically measures the line side supply voltage. The resultant information is transmitted across the high voltage isolation barrier to the system side circuitry, where control circuitry or a software process compares the digital representation of the measured voltage level to a predetermined value. Based on the results of this comparison, the control circuitry may alter the amount of power transferred across the high voltage isolation barrier to the line side circuitry in order to optimize power transfer efficiency. In one embodiment of the invention, a regulator is provided in series between an isolation transformer and the line side circuitry for purposes of regulating the supply voltage provided to the line side circuitry. The analog-to-digital converter of the line side circuitry may be configured to measure either the regulated or unregulated supply voltage, with corresponding modifications to a power management process. Further, the amount of power transferred across the isolation transformer may be varied in accordance with the invention by varying the frequency and/or duty cycle of differential transformer driver signals. In an alternate embodiment of the invention, a single-ended pulse is applied to the primary side of the transformer to effectuate power transfer.

4 Claims, 9 Drawing Sheets

DAA

U.S. PATENT DOCUMENTS

| | | | |
|---|---|---|---|
| 4,949,030 A | 8/1990 | Tse | 324/127 |
| 4,993,063 A | 2/1991 | Kiko | 379/405 |
| 4,995,111 A | 2/1991 | Tojo et al. | 379/382 |
| 5,097,503 A | 3/1992 | Cotty | 379/399 |
| 5,136,630 A | 8/1992 | Breneman et al. | 455/401 |
| 5,204,896 A | 4/1993 | Oliver | 379/106.04 |
| 5,222,124 A | 6/1993 | Castaneda et al. | 379/88.22 |
| 5,235,634 A | 8/1993 | Oliver | 379/106.06 |
| 5,245,654 A | 9/1993 | Wilkison et al. | 379/405 |
| 5,315,651 A | 5/1994 | Rahamin et al. | 379/412 |
| 5,369,666 A | 11/1994 | Folwell et al. | 375/222 |
| 5,369,687 A | 11/1994 | Farkas | 379/398 |
| 5,410,594 A | 4/1995 | Maruyama | 379/398 |
| 5,451,893 A | 9/1995 | Anderson | 327/174 |
| 5,500,895 A | 3/1996 | Yurgelites | 379/412 |
| 5,555,293 A | 9/1996 | Krause | 379/93.36 |
| 5,602,846 A | 2/1997 | Holmquist et al. | 370/384 |
| 5,654,984 A | 8/1997 | Hershbarger et al. | 375/257 |
| 5,655,010 A | 8/1997 | Bingel | 379/93.28 |
| 5,712,977 A | 1/1998 | Glad et al. | 395/200.09 |
| 5,737,397 A | 4/1998 | Skinner et al. | 379/93.29 |
| 5,740,241 A * | 4/1998 | Koenig | 379/399 |
| 5,754,036 A * | 5/1998 | Walker | 323/237 |
| 5,757,803 A | 5/1998 | Russell et al. | 370/494 |
| 5,786,992 A * | 7/1998 | Vinciarelli et al. | 363/89 |
| 5,790,469 A * | 8/1998 | Wong | 365/266 |
| 5,818,216 A * | 10/1998 | MacDonald | 379/379 |
| 5,870,046 A * | 2/1999 | Scott et al. | 379/412 |
| 5,875,235 A | 2/1999 | Mohajeri | 379/93.36 |
| 5,898,329 A | 4/1999 | Hopkins | 327/176 |
| 6,008,681 A | 12/1999 | Beutler et al. | 327/304 |
| 6,081,586 A | 6/2000 | Rahamim et al. | 379/93.29 |
| 6,091,806 A | 7/2000 | Rasmus et al. | 379/93.29 |
| 6,169,801 B1 | 1/2001 | Levassseur et al. | 379/413 |
| 6,330,330 B2 * | 12/2001 | Scott et al. | 379/412 |

OTHER PUBLICATIONS

Siemens, *Use's Manual—ICs for Communication*, PSB 4595 Version 2.0 and PSB 4596 Version 2.1, pp. 1–100.

LaPedus, Mark; "Consorium to Boost Home Networking", Electronic Buyers'News, Issue, Issue No. 1115, Jun. 29, 1998, pp. 36–37.

Gotcher, Renee and Kujubu, Laura, "The Network Comes Home", INFOWORLD, Oct. 26, 1998, pp. 74–86.

* cited by examiner

METHOD OF REGULATING POWER TRANSFER ACROSS AN ISOLATION BARRIER

CROSS-REFERENCE TO RELATED APPLICATIONS

The present application is a continuation-in-part of and claims priority to U.S. patent application Ser. No. 09/408,615, filed Sep. 30, 1999, which in turn claims priority to U.S. Provisional Application Ser. No. 60/131,897, filed Apr. 30, 1999, and U.S. Provisional Application Ser. No. 60/147,293, filed Aug. 4, 1999. All of these commonly-assigned patent applications are hereby incorporated by reference in their entirety, including drawings and appendices, and are hereby made part of this application for all purposes.

COPYRIGHT NOTICE

A portion of the disclosure of this patent document and/or the provisional application on which it is based contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

The present invention relates generally to communication devices for coupling to an external transmission medium; and, more particularly, it relates to an efficient method for regulating the transfer of power across a high voltage isolation barrier.

2. Related Art

Communication devices coupled to a telephone line or similar transmission medium generally must adhere to rigid electrical isolation requirements. Subscriber equipment or data communications equipment (DCE), such as data modems, typically provide for some form of electrical isolation to prevent voltage surges or transients originating from the subscriber equipment or lightning from having a deleterious effect on the telephone network and vice versa. Electrical isolation also addresses potential problems sometimes associated with differences in operating voltages between a telephone line and the subscriber equipment. More particularly, telephone line voltages may vary widely across a given network, and often exceed the operating voltage of subscriber equipment. In the United States, 1,500 volt isolation is currently required. In other countries, the prescribed isolation may reach 3,000–4,000 volts.

Isolation transformers are often employed to magnetically couple signals between a two-wire telephone line and the analog front end of a modem or other circuit while maintaining an appropriate level of electrical isolation. The isolation transformer functions to block potentially harmful DC components, thereby protecting both sides of the data connection.

The isolation transformer is typically part of what is referred to in the modem arts as a data access arrangement (DAA). The term DAA generally indicates circuitry which provides an interface between a public telephone network originating in a central office (CO) and a digital data bus of a host system or data terminal equipment (DTE). In addition to electrical isolation, the DAA may develop a number of signals (e.g., a ring signal) for provision to subscriber equipment. The DAA generally receives signals from the phone line through a telephone jack, such as a RJ11C connection as used for standard telephones.

Some modem configurations utilize a DAA having line side circuitry including telephone network interface and system side circuitry including a host system interface, the line side circuitry and system side circuitry being separated by the high voltage isolation barrier. Power for line side circuitry may be communicated from the host system across an isolation transformer or other isolation barrier. Difficulties arise in such a system, however, in minimizing power dissipation due to losses typically incurred in transferring power across the high voltage isolation barrier of a DAA. The inherent inefficiencies in prior transformer and regulator circuitry requires that the system side supply more power than actually required by the line side circuitry to detect and validate ring signals or to perform other communications functions. Such inefficiencies may be particularly problematic in a "wake-on-ring" or similar mode of operation in which power consumption specifications are very stringent, or when the current consumption of the line side circuitry is variable. Additionally, variations in voltage levels on the system side further complicate the transfer of power across the high voltage isolation barrier. The power transfer overhead needed to account for such variations may compound the effect of inefficiencies in the power transfer mechanism. Therefore, an improved method of transferring power across a high voltage isolation barrier is needed.

SUMMARY OF THE INVENTION

Briefly, the present invention provides an efficient method and circuitry for transferring various levels of power across a high voltage isolation barrier such as an isolation transformer. In one embodiment of the invention, a DAA is provided with system side circuitry that provides power to line side circuitry via the high voltage isolation barrier. The line side circuitry includes voltage measurement circuitry, such as an analog-to-digital converter, that periodically measures the line side supply voltage. The resultant information is transmitted across the high voltage isolation barrier to the system side circuitry, where control circuitry compares the digital representation of the measured voltage level to a predetermined value. Based on the results of this comparison, the control circuitry may alter the amount of power transferred across the high voltage isolation barrier to the line side circuitry in order to optimize power transfer efficiency.

In one embodiment of the invention, a regulator is provided in series between an isolation transformer and the line side circuitry for purposes of regulating the supply voltage provided to the line side circuitry. The analog-to-digital converter of the line side circuitry may be configured to measure either the regulated or unregulated supply voltage, with corresponding modifications to a power management process. Further, the amount of power transferred across the isolation transformer may be varied in accordance with the invention by varying the frequency and/or duty cycle of differential transformer driver signals. In an alternate embodiment of the invention, a single-ended pulse is applied to the primary side of the transformer to effectuate power transfer.

The analog-to-digital converter can be shared with other resources of the line side circuitry, such that operation of the analog-to-digital converter can be time-multiplexed for various functions, thereby minimizing the cost of the line side circuitry. In addition, the power management process may include a certain degree of hysterisis to prevent instability in the closed loop system.

Thus, the method and circuitry of the present invention reduce unnecessary power consumption that may result from variations in the supply voltage of the system side and variations in the current consumption of the line side circuitry of a DAA. Further, inefficiencies due to variations in the isolation barrier and regulator circuitry are mitigated.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION OF THE INVENTION

Figure 1:
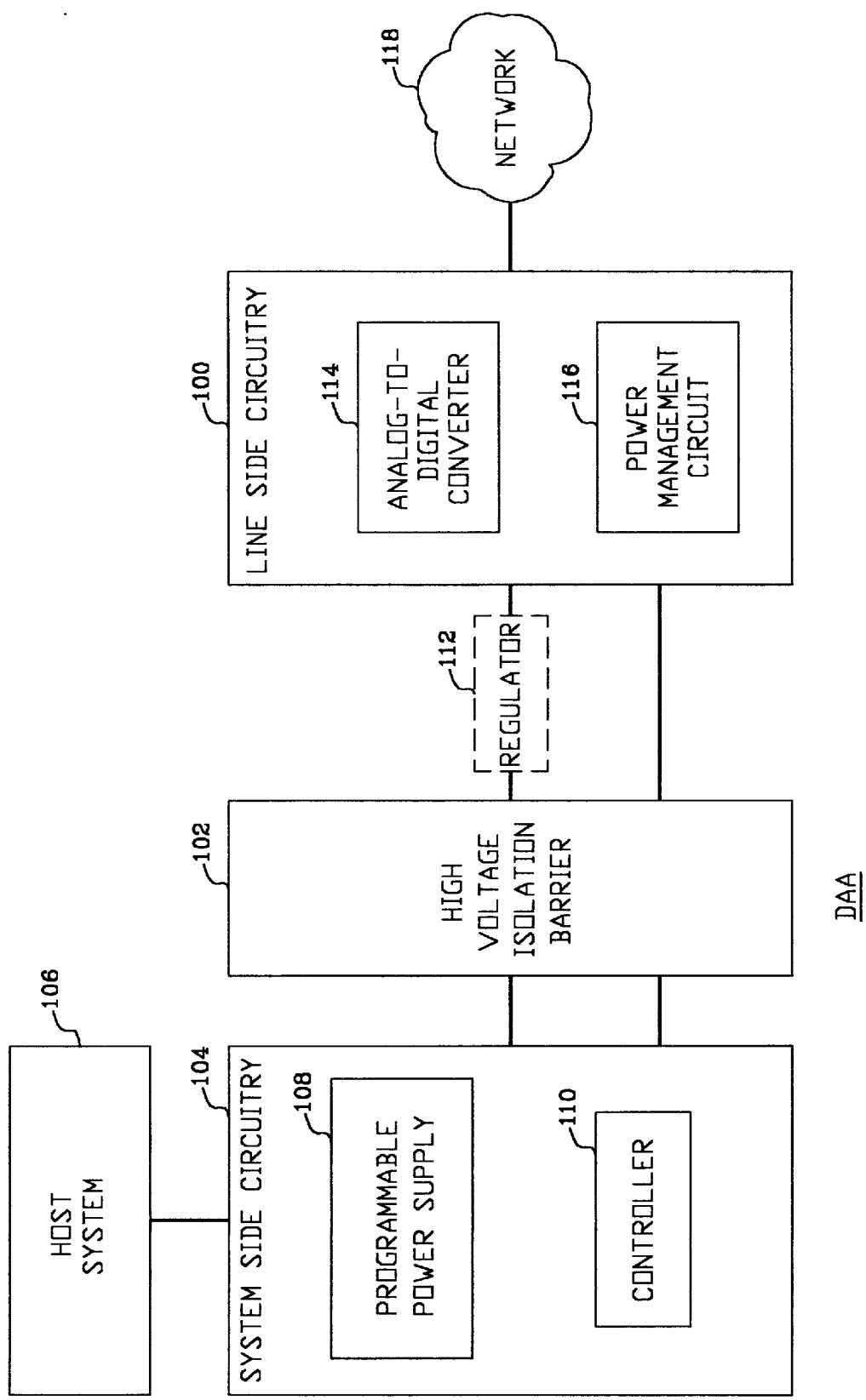
FIG. 1 is a drawing of an exemplary data access arrangement implemented in accordance with the present invention.

FIG. 1 is a drawing of an exemplary data access arrangement (DAA) implemented in accordance with the present invention. The DAA includes line side circuitry that receives power from a system side circuitry via a high voltage isolation barrier. The line side circuitry includes voltage measurement circuitry that periodically measures the voltage provided by the system side. Via control circuitry, this information is fed back to a programmable power supply of the system side, such that an optimal amount of power is provided to the high voltage isolation barrier. More specifically, the DAA is capable of altering the amount of power provided to the high voltage isolation barrier to account for any power transfer inefficiencies associated with the isolation barrier circuitry, driver circuitry, and any regulator circuitry. Power transfer is likewise optimized to accommodate fluctuations in both the system side supply voltage and the amount of current required by the line side circuitry.

Referring more specifically to FIG. 1, the disclosed embodiment of the DAA includes line side circuitry 100 and system side circuitry 104 separated by a high voltage isolation barrier 102. The line side circuitry 100 incorporates a telephone line interface for developing signals from and providing signals to a network 118. The system side circuitry is communicatively coupled to a host system 106, such as a computer system. The DAA may be internal or external to such a host system 106.

The system side circuitry 104 includes a programmable power supply 108 for generating different amounts of power for provision to the line side circuitry 100. System side controller circuitry 110 is provided to set the amount of power that is transferred to the line side circuitry 100 via the high voltage isolation barrier 102, as determined in part by voltage measurement information communicated by the line side circuitry 100. It is contemplated that the system side controller circuitry 110 could be included in an embedded device. Alternatively, the system side controller 110 functions could be performed by a host system processor, or by digital circuitry located in the line side circuit 100.

The line side circuitry 100 includes voltage measurement circuitry, such as an analog-to-digital converter (ADC) 114. The ADC 114 functions to measure a line side regulated supply voltage VREG (or a derivative thereof) provided by an optional regulator 112. Alternatively, the ADC 114 may be configured to measure an unregulated voltage VUNREG provided directly by the high voltage isolation barrier 102, or an unregulated voltage at the input of the optional regulator 112. The ADC 114 can be shared with other resources of the line side circuitry 100, such that operation of the ADC 114 can be time-multiplexed for various functions, thereby minimizing the cost of the line side circuitry 100.

Information generated by the ADC 114 is provided to a power management circuit 116. The power management circuit 116 functions to coordinate communication of a digital representation of the measured voltage level to the system side circuitry 104 via the high voltage isolation barrier 102. The programmable power supply 108, controller 110, and power management circuitry 116 coordinate to dynamically alter the voltage provided to the line side circuitry 100 in a manner such as that described generally below in conjunction with FIGS. 2 and 3.

In one contemplated embodiment of the invention, the combined power consumption of the system side circuitry 104 and line side circuitry 100 does not exceed a specified power requirement, which is dependent on the operational mode of the system. At least three operational modes are contemplated (with exemplary power limitations):

a) Ultra low-power mode—total power consumption not to exceed 3 mW;

b) Low-power mode—total power consumption not to exceed 15 mW; and c) Normal operating mode—total power consumption not to exceed 100 mW.

In a wake-on-ring state, for example, the system normally operates in ultra low-power mode until a probable valid ring signal is detected. Once such a signal is recognized, the programmable power supply 118 is switched to accommodate a low-power mode for performing further validation of the probable valid ring signal. Following validation of the probable valid ring signal, the system is placed in normal operating mode to conduct communication operations with the telephone network 118. The power management circuit 116 in conjunction with the controller 110 may be used to govern switching between various power modes.

The line side circuitry 100 may also include detection circuitry that is programmable to measure electrical characteristics (e.g., ring detection circuitry) of a telephone line interface. The DAA may be software programmable via control signals sent across the high voltage isolation barrier 102 to establish ring detection criteria corresponding to a specific country where the equipment may be used.

A CODEC may also be provided in the line side circuitry 100, such that encoded information generated by the CODEC, as well as information for decoding by the CODEC, is communicated across the high voltage isolation barrier 102. By placing the CODEC on the line side of the DAA, these communications may be accomplished in a digital manner, thereby permitting a reduction in the size and expense of the high voltage isolation barrier 102. It is also possible at this stage to capture caller ID information that typically follows the first ring signal.

A DAA in accordance with the present invention can be utilized with any product that interfaces a telephone network 118 to any digital signal processor technology, or any-process of a host system that performs analog modem modulations. Examples include, but are not limited to, data modems, computers, web browsers, set top boxes, fax machines, cordless telephones and telephone answering machines. In addition, many different interfaces with the telephone network 118 and/or other transmission medium are contemplated, such that the DAA may be configured to be compatible with whichever means is utilized.

Figure 2:
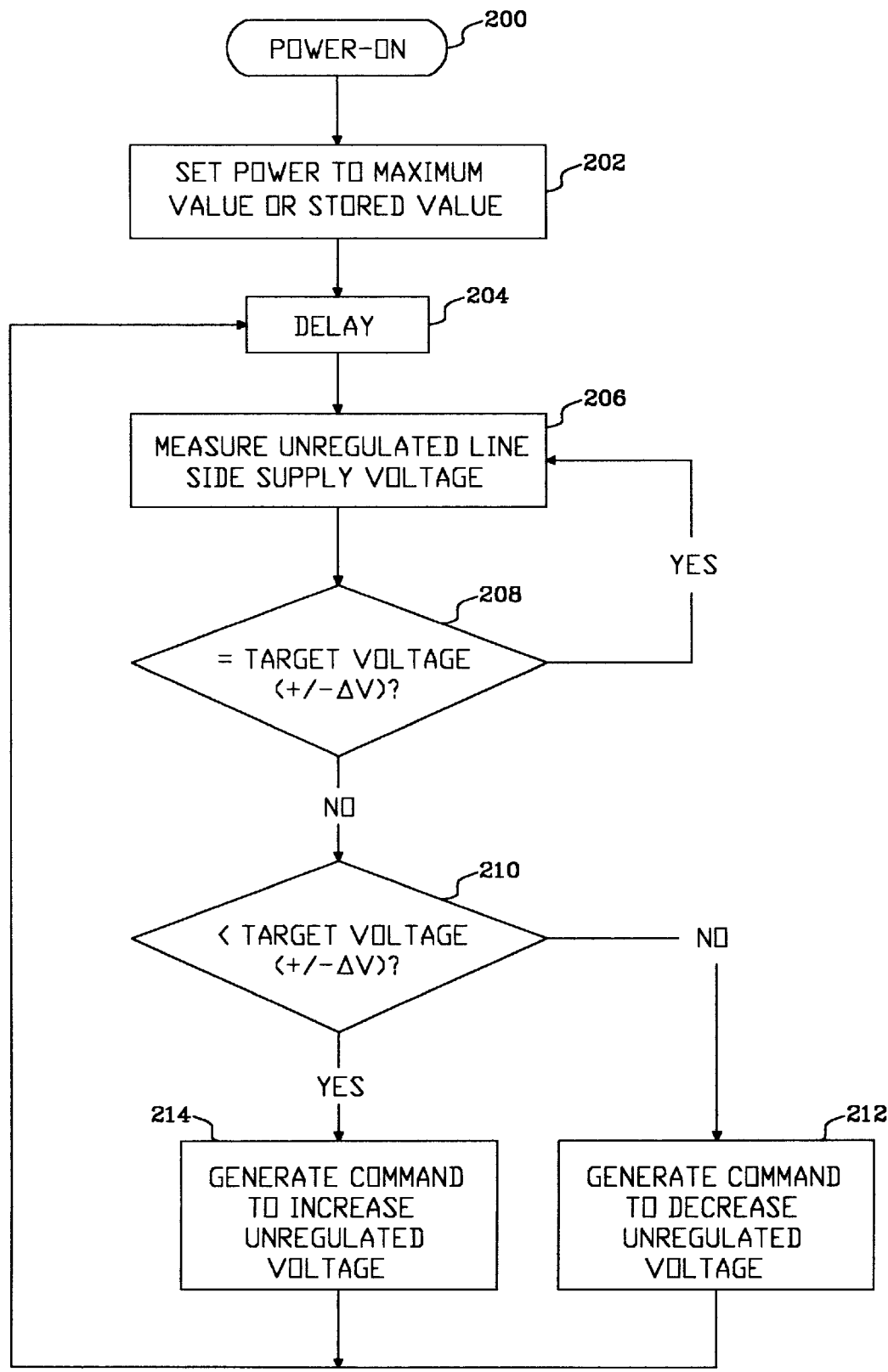
FIG. 2 is a flow diagram of an exemplary power management process implemented by the data access arrangement of FIG. 1, wherein an unregulated supply voltage is monitored.

FIG. 2 is a flow diagram of an exemplary power management process implemented by the DAA 100 of FIG. 1, wherein an unregulated supply voltage VUNREG is monitored. Following initialization of the system in power-on step 200, the controller 110 instructs the programmable power supply 108 to supply a maximum value of power to the high voltage isolation barrier 102 in step 202. Alternatively, the controller 110 may instruct the programmable power supply 108 to provide a predetermined amount of power that is less than the maximum value. This predetermined amount of power may have been stored from a previous run of the power management process. In either case, the initial voltage received by the line side circuitry 100 should be sufficient to enable operation of at least the ADC 114 and power management circuit 116.

Next, in step 204, the process is delayed in order to permit the power settings to take effect. The unregulated supply voltage VUNREG is then measured by the ADC 114 in step 206. The results of this measurement are examined by either the power management circuit 116 or the controller 110. In either case, information relating to the measured voltage is communicated to the system side circuitry 104 via the high voltage isolation barrier 102 or other data path. The measured value of the unregulated supply voltage VUNREG is compared to a target voltage in step 208. The target voltage may correspond, for example, to a nominal operating voltage for the line side circuitry 100, having a tolerance of ΔV. If the measured voltage is within the target voltage range as determined in step 208, the measurement process is repeated at step 206. In the disclosed embodiment of the invention, the time delay of step 204 generally corresponds to the time constant of signals propagating through the power supply and high voltage isolation barrier. By adding a delay to the control loop, system stability is improved. In one contemplated embodiment of the invention, the ADC 114 has a supply voltage sampling rate of approximately 8 ms. The sampling rate could be varied depending on the particularized delay through the high voltage isolation barrier 102 and optional regulator 112.

If the measured supply voltage VUNREG is not within the target range as determined in step 208, the process proceeds to step 210 where it is determined if the measured supply voltage VUNREG is higher or lower than the target voltage. If higher, a command is sent in step 212 to the programmable power supply 108 to decrease the amount of power supplied to the high voltage isolation barrier, thereby decreasing the unregulated supply voltage VUNREG.

If the measured supply voltage VUNREG is lower than the target voltage range as determined in step 210, the process proceeds to step 214, where a command is sent to the programmable power supply 108 to increase the amount of power supplied to the high voltage isolation barrier 102, thereby increasing the unregulated supply voltage VUNREG. Following either of steps of 212 or 214, the process is again delayed in step 204.

As will be appreciated, the illustrated power management process should be considered exemplary in nature, and numerous variations are possible without departing from the scope or spirit of the present invention. For example, step 210 could be altered such that it is determined if the measured supply voltage is greater than a target voltage, in which case steps 212 and 214 would be reversed.

Figure 3A:
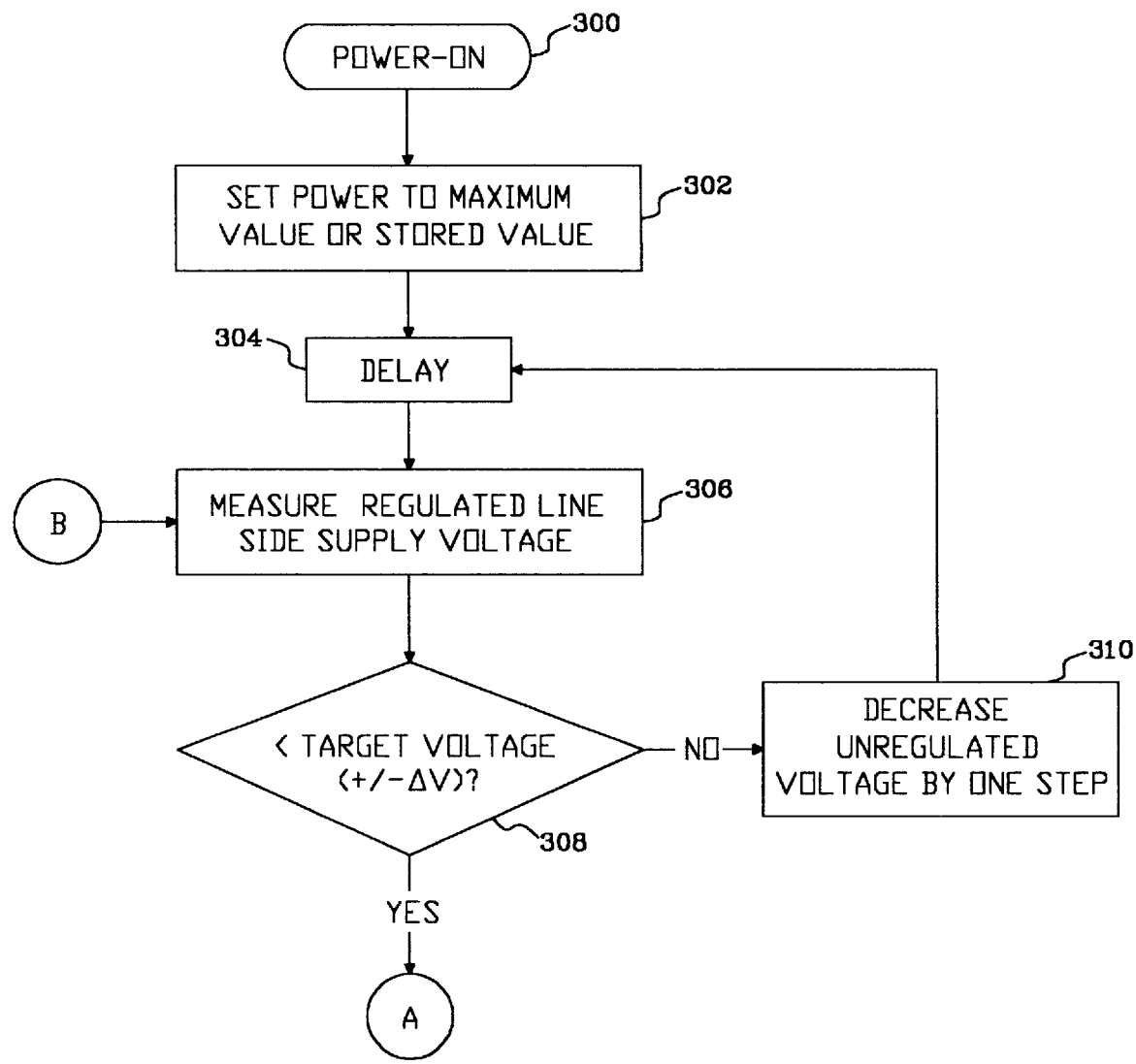
FIGS. 3A and 3B are flow diagrams of an exemplary power management process implemented by the data access arrangement of FIG. 1, wherein a regulated supply voltage is monitored.
Figure 3B:
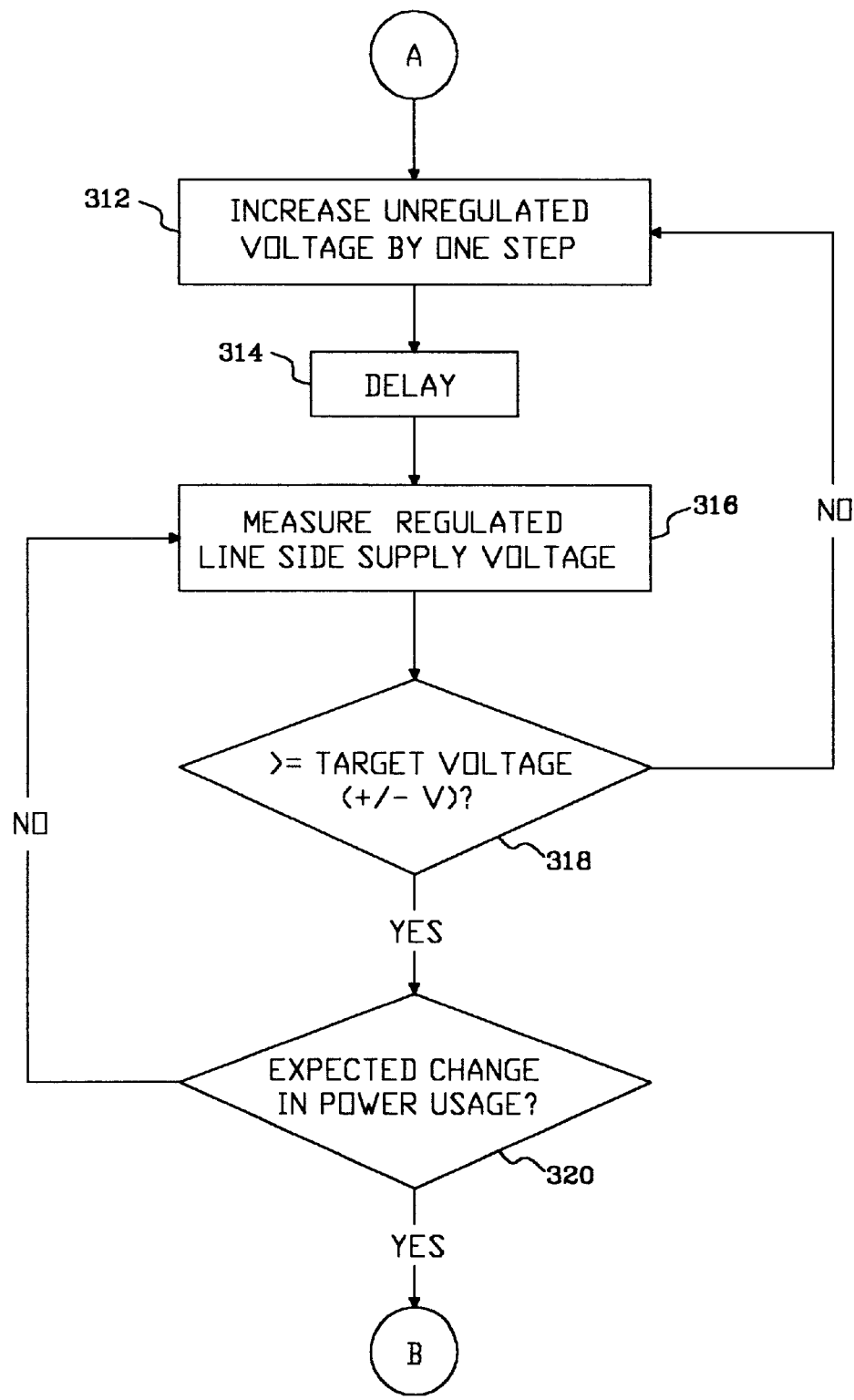

FIGS. 3A and 3B are flow diagrams of an exemplary power management process implemented by the DAA 100 of FIG. 1, wherein a regulated supply voltage is monitored. Monitoring a regulated supply voltage is complicated by the fact that changes to an unregulated supply voltage are not necessarily reflected in the regulated supply voltage. More particularly, the function of the regulator is to keep the supply voltage constant. Accordingly, unregulated supply voltages greater than the nominal output of a regulator generally produce the same supply voltage. The process of FIGS. 3A and 3B therefore utilizes an iterative approach wherein the unregulated supply voltage is gradually decreased until a change is observed in the monitored, regulated supply voltage. The unregulated supply voltage is then incrementally increased such that the unregulated supply voltage is only nominally greater than the regulated supply voltage, thereby improving the efficiency of the power transfer process.

Following initialization of the system in power-on step 300, the controller 110 instructs the programmable power supply 108 to supply a maximum value of power to the high voltage isolation barrier 102 in step 302. Alternatively, the controller 110 may instruct the programmable power supply 108 to provide a predetermined amount of power that is less than the maximum value. This predetermined amount of power may have been stored, for example, from a previously run of the power management process.

Next, in step 304, the process is delayed as described generally above in conjunction with FIG. 2, until the regulated supply voltage has stabilized. The regulated supply voltage is then measured in step 306. The results of this measurement are examined by either the power management circuit 116 or controller 110. Information relating to the measured voltage is communicated to the system side circuitry 104 via the high voltage isolation barrier 102 or other datapath. The measured value of the regulated supply voltage is compared to a target voltage in step 308. If the measured voltage is equal to the target voltage, the process proceeds to step 310 and the programmable power supply 104 is directed to decrease the unregulated voltage by one step. For example, the unregulated voltage may be decremented by 0.1 volts or other predetermined voltage step.

If the measured voltage is less than the target voltage as determined in step 308, the process proceeds to step 312 (FIG. 3B) and the programmable power supply 108 is directed to increase the unregulated voltage by one step or other predetermined amount. The process is then again delayed in step 314 for an amount of time sufficient to allow the regulated voltage to settle. In one contemplated alternative embodiment, the process may return to step 304 following step 312.

Next, in step 316, the regulated supply voltage is measured by the ADC 114. This measured voltage is again compared to the target voltage in step 318. If the measured voltage is less than the target voltage, the process returns to step 312 and the unregulated voltage is again increased by one step or a predetermined amount. These steps are repeated until the measured voltage is greater than or equal to the target voltage. At this point, the process proceeds to step 320 and the line side circuitry 100 is examined to determine if a change in power usage is expected. Power usage may change, for example, if the line side circuitry 100 progresses from an on-hook state to an off-hook state as determined by ring detect circuitry (not separately illustrated).

If no change in power usage is expected as determined in step 320, the process returns to step 316. If power usage is expected to change, the process instead returns to step 306 where the regulated voltage is measured to determine if additional adjustments to the unregulated supply voltage are required to improve the efficiency of the regulator. In this manner, the unregulated power supply voltage may be iteratively adjusted until it is nominally above the required regulated voltage by only an amount approximately equivalent to the dropout voltage of the regulator (typically on the order of 200 mV), thereby minimizing losses in the transfer of power across the high voltage isolation barrier 102 and in the regulator.

Figure 4:
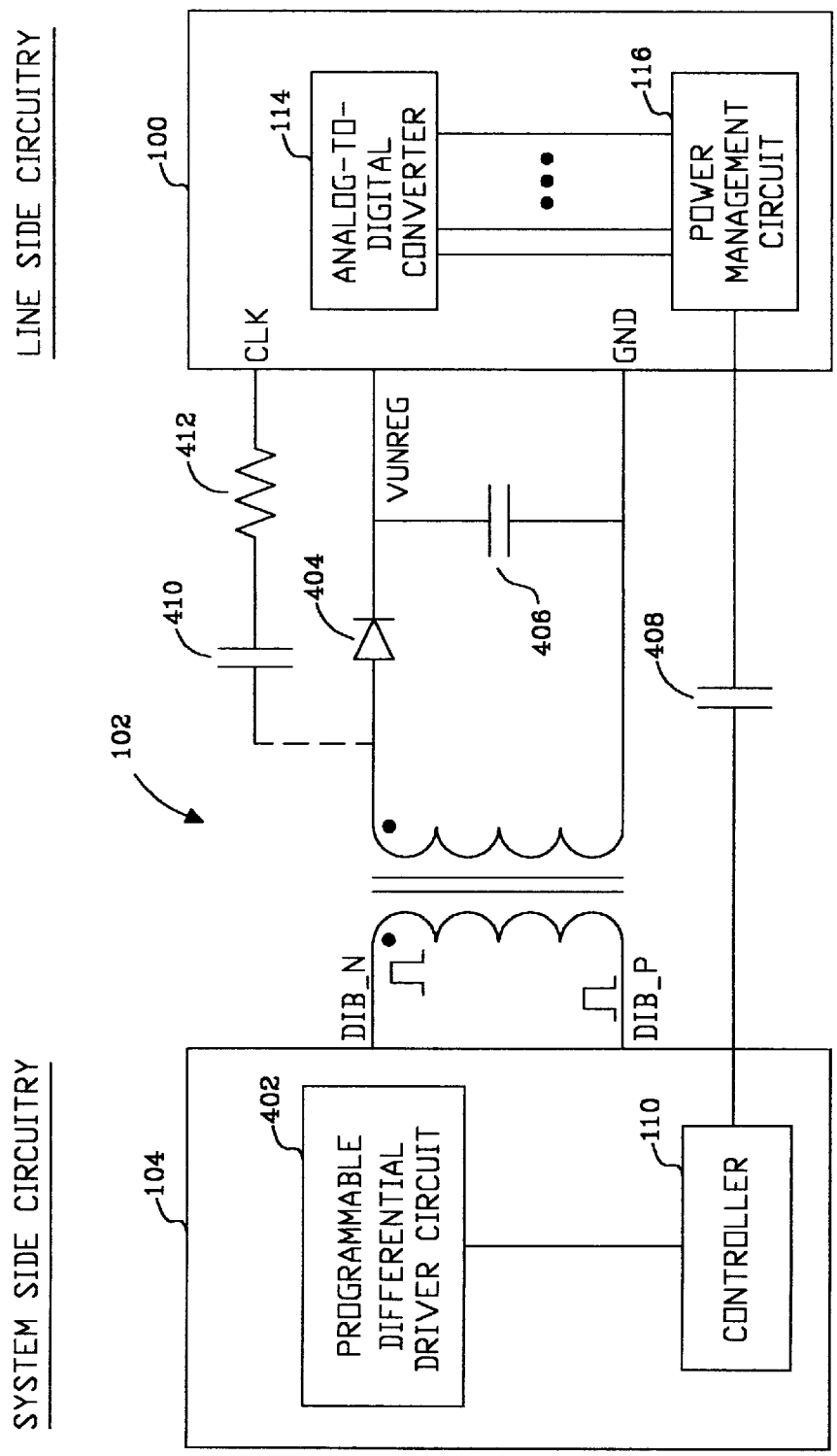
FIG. 4 is a schematic diagram providing exemplary details of a high voltage isolation barrier comprising a transformer driven by differential signals capable of transferring power in accordance with the present invention.

FIG. 4 is a schematic diagram providing exemplary details of a high voltage isolation barrier 102 comprising a transformer 400 having a primary side driven by differential signals DIB_P and DIB_N. The differential transformer driver signals DIB_P and DIB_N are used to transfer power from the system side circuitry 104 to the line side circuitry 100 via the transformer 400, and may be varied in accordance with the present invention to actively control the line side supply voltage.

Figure 8:
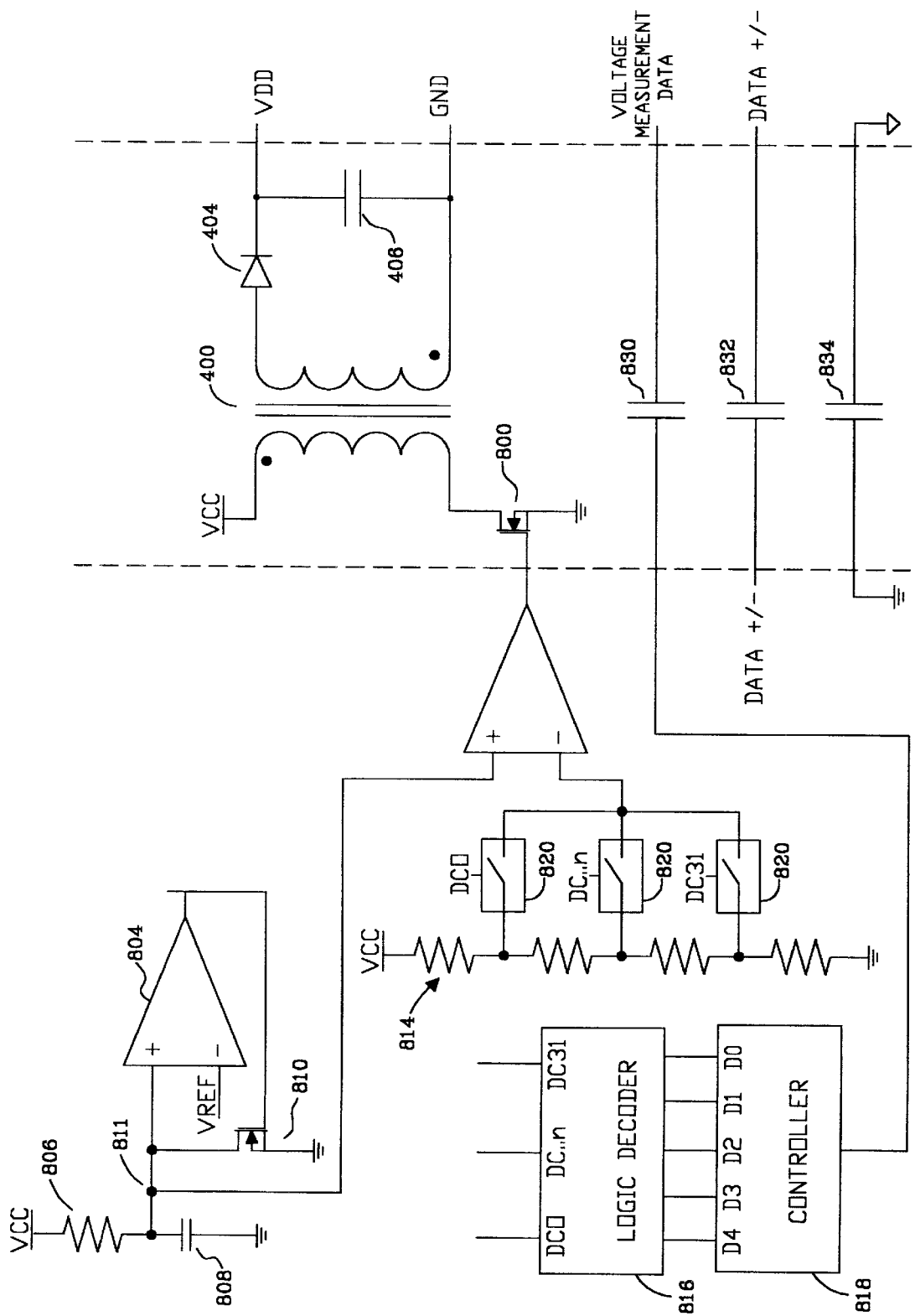
FIG. 8 is a schematic diagram providing exemplary details of alternate transformer driver circuitry capable of transferring power in accordance with the present invention.

In the disclosed embodiment of the invention, the efficiency of the transformer driver circuitry at low power levels is improved by driving the primary of the transformer 400 with offset differential signals having relatively small duty cycles (FIGS. 5A–5C) or a single ended signal having a relatively small duty cycle (FIG. 8). It is also contemplated that offset differential signals DIB_P and DIB_N having relatively high frequencies (e.g., 4 MHz) and/or duty cycles could be utilized to increase the efficiency of power transfer across the transformer 400.

The offset differential transformer driver signals DIB_P and DIB_N are provided to the transformer 400 by a programmable differential driver circuit 402 located in the system side circuitry 104. As will be appreciated by those skilled in art, the programmable differential driver circuit 402 may take many forms. Exemplary details of a programmable differential driver circuit 402 for use with the present invention are discussed below in conjunction with FIG. 6. Operation of the programmable differential driver circuit 402 is controlled by the controller 110.

The secondary side of the transformer 400 is coupled to the power supply node VDD of the line side circuitry 100 via a rectifier diode 404. Energy for use by the line side circuitry 100 (provided in the form of a rectified signal) is stored by a capacitor 406 coupled between the power supply node VDD and ground node GND of the line side circuitry 100. In other contemplated embodiments, the rectifier diode 404 could be replaced by a full bridge rectifier. In addition, a regulator could be used in series between the rectifier diode 404 and the line side circuitry 100 (following the capacitor 406) to limit the voltage provided to the line side circuitry 100 without limiting or clamping the voltage across the terminals of the transformer 400.

The high voltage isolation barrier 102 may also include one or more capacitors 408 (or, alternatively, opto-couplers) for communicating bidirectional data between the system side circuitry 104 and the line side circuitry 100, including data relating to the measured line side supply voltage. In addition, a clock signal CLK may also be transferred across the high voltage barrier 102 in conjunction with the transformer driver signals. It should be noted that the transformer 400 should have relatively good operating characteristics at the clock frequency of interest. Any such clock signals are preferably AC-coupled from the secondary of the transformer 400 to the line side circuitry 100 via a series-connected capacitor 410 and a current limiting resistor 412.

As noted above, the efficiency of the transformer 400 will impact the total power consumption of the DAA. If the maximum total power consumption of the DAA in ultra low-power mode is specified at 3 mW, for example, the power consumption of the line circuitry 100, the system side circuitry 104, as well as losses to the transformer 400 must all be considered in the power budget calculation. The ratio of the power used by the line side circuitry 100 and the power supplied by the system side circuitry 104, multiplied by 100, provides a numerical approximate of the efficiency of the transformer:

$$P_{Line\_Side}/P_{Sys\_Side} \times 100 = (eta),$$

where $$P_{Line\_Side} = I_{Line\_Side} \times V_{Line\_Side}$$
$$P_{Sys\_Side} = I_{Sys\_Side} \times V_{Sys\_Side}$$

In the embodiment of the invention disclosed in FIG. 4, the efficiency of power transfer across the transformer 400 is improved by providing offset differential transformer driver signals DIB_P and DIB_N to the primary side of the transformer 400. Further, the duty cycles of the respective differential signals may be adjusted to alter the line side supply voltage. Generally, a decrease in the duty cycle of the signals applied to the primary of the transformer 400 is reflected by a decrease in current to the primary side of the transformer 400 and a corresponding decrease in power supplied to the secondary side of the transformer 400.

More specifically, in the first cycle, a square wave positive input signal at output DIB_P is applied to the primary side of the transformer 400 with a duty cycle Δ. In this cycle current through the transformer 400 increases linearly with time (L×I=V×t) according to the general equation for an inductor, Ldi/dt=V where V is the amplitude of the square wave signal (constant) and t is the time the square wave is at a logic HIGH voltage level. If the duty cycle Δ is expressed as a percentage of the clock period T, the time value t can be expressed as t=Δ×T=Δ/f, where f=1/T is the frequency of the input (driving) signal. For example, a 50% duty cycle yields a time value of t=0.5T. Power transfer in the transformer during time T can be represented as energy per unit time by the following equation:

$$P = \tfrac{1}{2} L p\, I_p^2 f, \qquad [1]$$

where Lp is the primary inductance of the transformer, and $I_{peak}$ is the peak current reached in the inductor during one period of the input signal or after time t=ΔT, and f is the inverse of the period T.

The duty cycle Δ of the input signal is related to $I_{peak}$ according to the following equation:

$$I_{peak} = \frac{V \cdot \Delta \cdot T}{Lp} = \frac{V \cdot \Delta}{Lp \cdot f} \quad [2]$$

Therefore, an increase in the duty cycle of the input clock signal is reflected to an increase in peak current, which results in a corresponding increase in power to the transformer according to equation [1]. Substituting equation [2] into equation [1] yields P=½V²×Δ²/Lp×f, which illustrates that the duty cycle Δ has a greater effect than frequency in power transfer to the transformer 400.

In the second cycle, when the voltage at the primary side of the transformer 400 is "reversed" by applying a time-delayed, positive signal at DIB_N, current flows in the secondary through diode 404 and causes magnetic fluxes in the transformer core which tend to cancel the flux generated by the primary current. Hence, the equivalent inductance of the transformer 400 seen at the primary side is lowered (preferably to zero), and the current Ip in the primary side becomes related to the current Is in the secondary side by the formula Ip=N×Is, where N is the turn ratio of the secondary winding of the transformer 400 to its primary winding. Also, the voltage Vs at the secondary side of the transformer 400 is related to the voltage Vp at the primary side by the formula Vs=N×Vp.

Assuming that Vs=VUNREG (the forward voltage drop of diode 204 can be neglected with respect to VUNREG) and that Vp=Vcc−Rdib×Ip, where Vcc is the power supply voltage on the system side circuitry 104 (or Vp max) and Rdib is the total combined output resistance of transformer driver circuitry that provides the transformer driver signals DIB_P and DIB_N, it is possible to relate the duty cycle of the clock signal to the supply voltage VUNREG expected on the line side and load RL present on the line side using the following equation:

Duty Cycle=[($N^2$×Rdib)/(N×Vcc−VUNREG]×(VUNREG/RL). [3]

Equation [3] demonstrates that the duty cycle is a function of the output resistance of the transformer driver circuitry, and of the load on the secondary side. Therefore, an alternative method to control the power delivered to the line side involves varying the quantity Rdib using an array of switches controlled by a controller 110 on the system side or other impedance control circuitry to adjust the impedance of the transformer driver circuitry. For example, the impedance control circuitry could be used to effectively vary the size (W/L) of the output transistors in the transformer driver circuitry to vary the transistors' on-resistance (Rdib).

Since the current Ip in the second cycle is related to the current consumption in the line side circuitry 100, the power delivered to the transformer 400 is limited by power losses in the primary side equal to Rdib×$Ip^2$. However, if the primary of the transformer 400 is "precharged" as described in the first cycle discussed above, the energy stored in the primary side (½ Lp $I_{peak}^2$) is used in conjunction with the current Ip of the second cycle to transfer energy to the line side circuitry 100. This combination of factors can improve power efficiency considerably, depending on the load and duty cycles selected for the transformer driver signals DIB_P and DIB_N.

To achieve relatively good efficiency, therefore, the appropriate clock polarity sequence should be applied to the primary side of the transformer 400 so that the first cycle corresponds to a charging phase with current flowing only in the primary side. Also, it may be important that the transformer driver signals DIB_P and DIB_N are of equal pulse width, respectively, so that the DC average voltage applied to the primary side of the transformer over one period T is approximately zero. This approach increases efficiency because the equivalent DC current flowing through the primary of the transformer is approximately zero.

Although it is contemplated that a clock signal may be supplied to the line side circuitry 100 via the transformer 400, this configuration requires that the transformer 400 be optimized for the specified clock frequency. Also, in order to comply with FCC and other government regulations throughout the world, this configuration may require additional circuitry to suppress the clock signal and its related harmonics injected into the subscriber equipment.

Alternatively, a relatively large value capacitor 834 (FIG. 8) coupled between the ground nodes of the system side circuitry 104 and the line side circuitry 100 may be used to provide a return path or ground reference for signals transferred between the system side circuitry 104 and line side circuitry 100. Such a configuration reduces the need to use differential drivers to transfer data between the two sides, permitting a single, relatively small value capacitor to be used for each data path and for a clock signal. This configuration also enables relatively easy compliance with regulatory requirements addressing radio frequency emissions, because the frequency of the power clock to the transformer 400 can be chosen to be outside the range measured by the FCC, for example, independently of the signal clock delivered to the line side circuitry 100 via a separate transmission path.

Another advantage provided by such a configuration is that the frequency and duty cycle of the differential transformer driver signals DIB_P and DIB_N can be chosen to match and optimize the characteristics of the transformer 400. Therefore, by choosing an optimal frequency for the transformer outside the bands where the FCC is most restrictive, and by varying the duty cycle, it is possible to maintain efficient control over the power delivered to the line side circuitry 100 via the transformer 400 without affecting regulatory compliance.

Command or programming signals such as those used to adjust the line side supply voltage, may also be multiplexed and serialized for transmission across the isolation barrier 102, thereby reducing the complexity and expense of the isolation barrier 102. Data signals may also be combined with command or programming signals, further simplifying the isolation barrier 102.

Figure 5A:
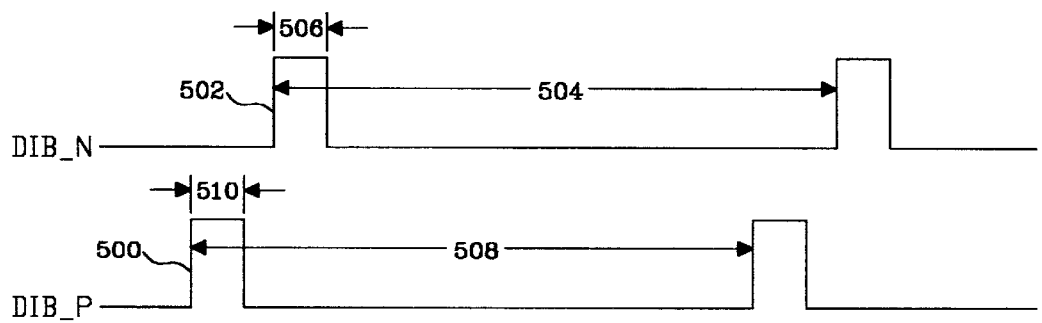
FIGS. 5A–5C illustrate exemplary transformer driver waveforms according to the present invention as used by the circuitry of FIG. 4.
Figure 5B:
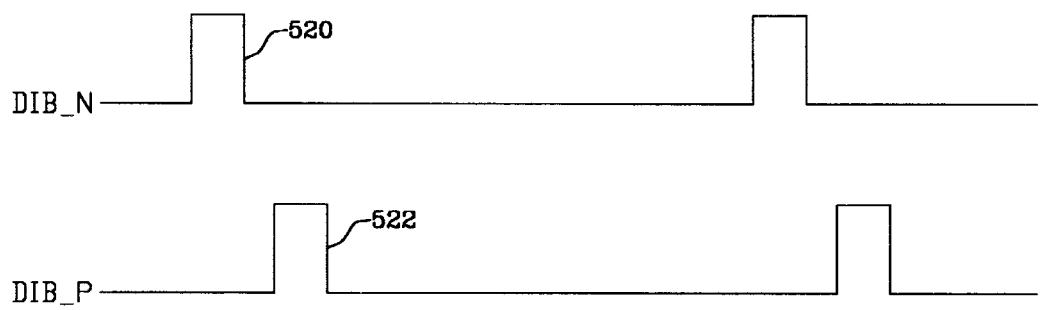
Figure 5C:
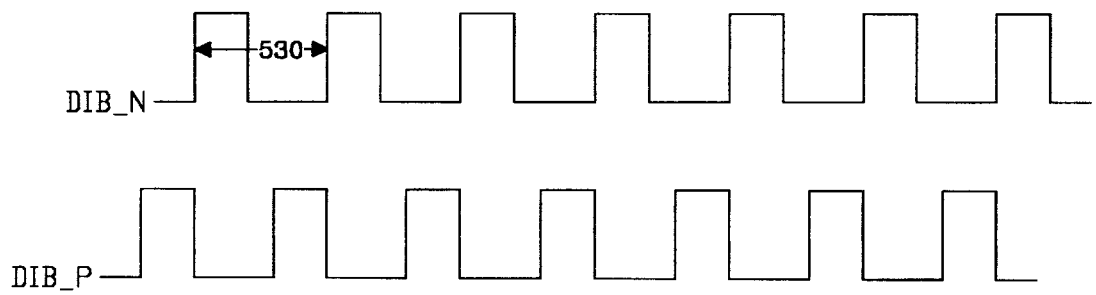

FIGS. 5A–5C illustrate exemplary waveforms for differential transformer driver signals DIB_P and DIB_N in accordance with the present invention. In general, the amount of power transferred across the transformer 400 is related to both the duty cycle and frequency of the driver signals, assuming a typical voltage (e.g., 3.3 volts) on the system side. In an ultra-low power mode, for example, the duty cycles of the transformer driver signals DIB_P and DIB_N may be approximately 1%–2% with a frequency of 330 KHz. As will be appreciated, the duty cycles of the transformer driver signals DIB_P and DIB_N may be varied in accordance with the present invention to dynamically adjust the amount of power provided to the high voltage isolation barrier 102.

Referring more specifically to FIG. 5A, a leading pulse 500 is provided by the transformer driver signal DIB_P to the negative terminal of the primary side of the transformer 400. Immediately following the initial pulse 500, a lagging pulse 502 is provided by the transformer driver signal DIB_N to the positive terminal of the primary side of the transformer 400. The initial pulse 500 functions to precharge the transformer 400 before energy is transferred to the secondary load by the pulse 502. This configuration improves the efficiency of the energy transfer across the transformer 400. More specifically, if the charging pulse is applied in a direction such that current does not flow in the secondary circuit (diode 404 reverse-biased), the inductance seen by the driver circuits is equivalent to the inductance of the primary side of the transformer 400, and energy can be efficiently stored in the transformer 400. In the next phase, the stored energy in the transformer 400 is discharged to the secondary load, which decreases the amount of current required of the transformer primary drivers to deliver the necessary energy to the secondary side, and consequently decreases resistive losses in the drivers and partially "returns" energy to the power supply of the primary driver.

The respective periods 504 and 508 of the differential transformer driver signal DIB_P and DIB_N, respectively, are preferably equal such that differential pulses are consistently spaced with respect to one another. It should also be noted that the respective duty cycles of the transformer driver signals DIB_P and DIB_N may affect the efficiency of power transfer across the transformer 400. In the waveforms illustrated in FIG. 5A, the leading pulse 500 of the transformer driver signal DIB_P has a width 510 (i.e., duty cycle) that is equal to the width 506 of a pulse 502 of the transformer driver signal DIB_N. However, it may be beneficial to change the duty cycles of the transformer driver signals DIB_P and DIB_N with respect to each other to balance the charge and discharge phases with respect to the load on the secondary and improve the overall efficiency of the power transfer from the system side circuitry 104 to the line side circuitry 100.

FIG. 5B illustrates an alternate embodiment of the invention in which pulses 520 of the transformer driver signal DIB_N precede pulses 522 of the transformer driver signal DIB_P. Although this signal may not result in as much efficiency as the signals shown in FIG. 5A, the offset relationship between the pulses 520 and 522 still provides improved power transfer characteristics as compared to prior solutions.

FIG. 5C illustrates a relatively higher power mode of operation in which the period 530 of both the transformer driver signals DIB_P and DIB_N corresponds to a relatively high frequency (e.g., 4 MHz). Increases in the duty cycles of the transformer driver signals DIB_P and DIB_N may also be effected in order to increase power delivered to the line side circuitry 100.

Figure 6:
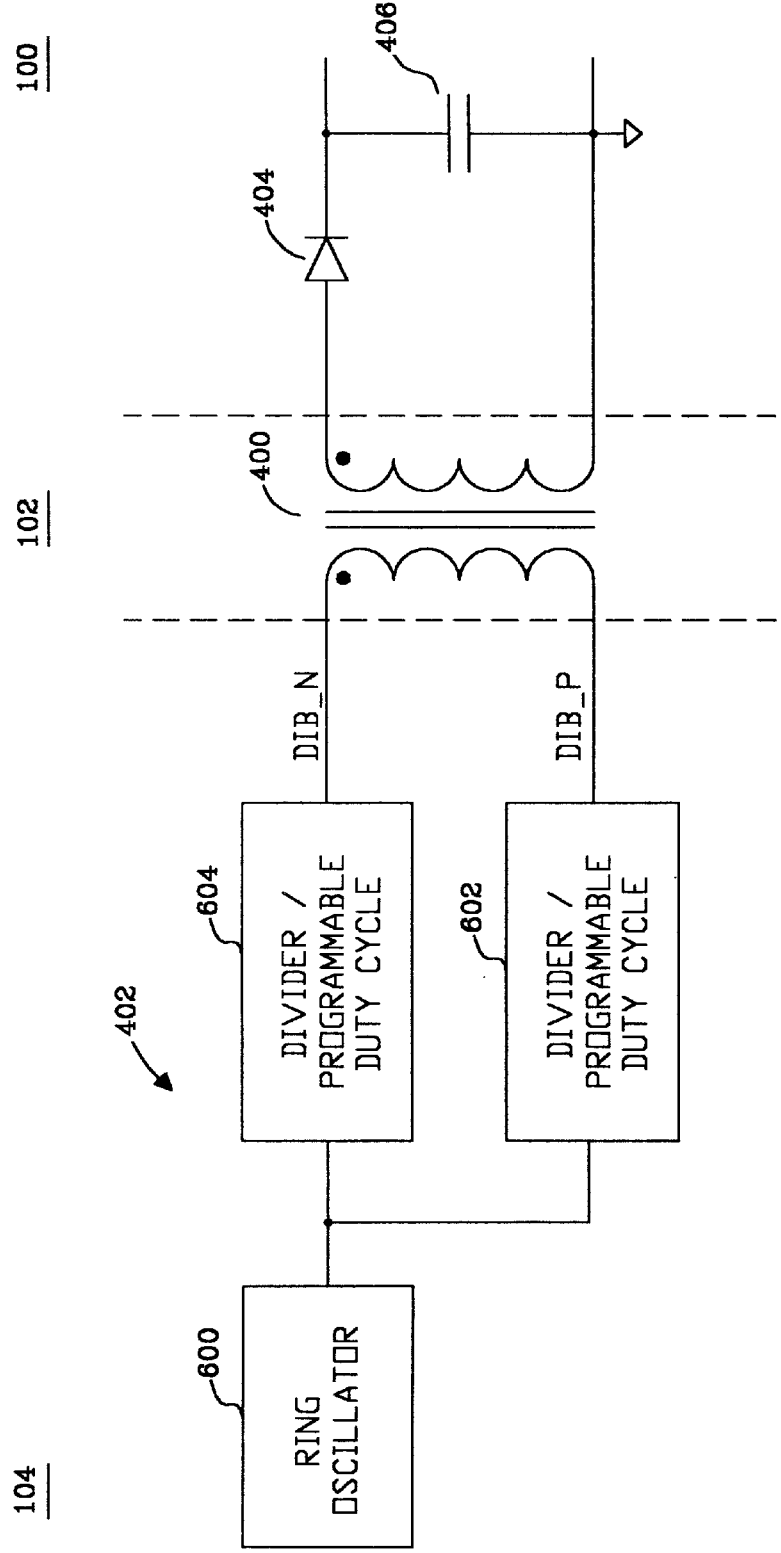
FIG. 6 is a block diagram providing exemplary details of the transformer driver circuitry of FIG. 4.
Figure 7:
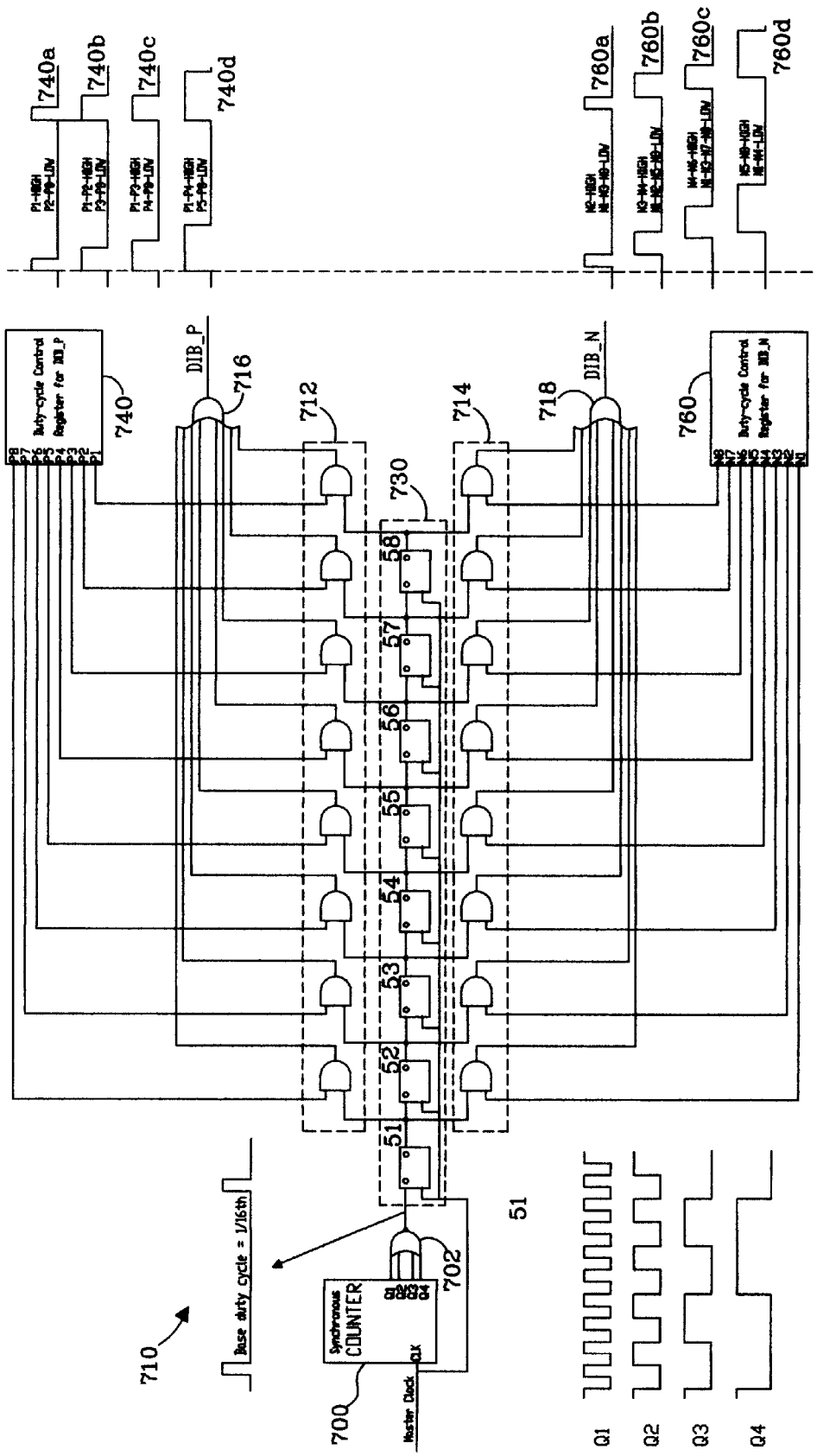
FIG. 7 is a schematic diagram of exemplary circuitry for implementing the programmable duty cycle circuitry of FIG. 6 in accordance with the present invention.

FIG. 6 is a block diagram providing details of the programmable differential driver circuit 402 in FIG. 4. In the illustrated embodiment, a ring oscillator 600 and a pair of dividers/programmable duty cycle circuits 602 and 604 are provided in the system side circuitry 104. In operation, the output of the ring oscillator 600 is provided as a reference clock to each of the divider/programmable duty cycle circuits 602 and 604. The divider/programmable duty cycle circuit 602 is programmed (e.g., by the controller 110) to divide the frequency of the signal provided by the ring oscillator 600 to a desired value, and is also capable of adjusting the duty cycle of the transformer driver signal DIB_P. Likewise, the dividers/programmable duty cycle circuit 504 is programmable (e.g., by the controller 110) to divide the frequency of the signal received from the ring oscillator 500 to a desired value. The divider/programmable duty cycle circuit 604 is also programmable to vary the duty cycle of the transformer driver signal DIB_N in general accordance with the exemplary wave form depicted in FIGS. 5A and 5B. FIG. 7 provides exemplary details of the divider/programmable duty cycle circuitry 602 and 604.

FIG. 7 is a schematic diagram of an exemplary digital circuit for implementing the programmable duty cycle circuitry 604 of FIG. 6 in accordance with the present invention. A synchronous counter 700 is provided for dividing the frequency of a master clock signal provided to a clock input CLK. More specifically, the synchronous counter 700 provides outputs Q1, Q2, Q3 and Q4 that divide the master clock signal by two, four, eight and sixteen, respectively.

The outputs Q1, Q2, Q3 and Q4 are individually provided to the inputs of a four-input NOR gate 702 to generate an output signal (shown as waveform 710) with a base duty cycle equal to $\frac{1}{16}^{th}$ (6.25%) of the master clock period. The output signal 710 is provided to the input of a shift register 730 having outputs S1 through S8. The shift register 730 shifts the input signal 710 by one through eight master clock cycles, which are provided by the outputs S1–S8.

The outputs S1–S8 are individually provided to one input of one of the AND gates in an array 712 of eight AND gates. The second input of each AND gate in the array 712 is coupled to one of the control signals P1–P8 provided by a duty-cycle control register 740. The output of each AND gate in the array 712 is provided to an input of the eight-input OR gate 716. The output of the OR gate 716 is designated as the duty-cycle controlled transformer driver signal DIB_P.

Similarly, the outputs S1–S8 are also individually provided to one input of one of the AND gates in an array 714 of eight AND gates. The second input of each AND gate in the array 714 is coupled to one of the control signals N1–N8 provided by a duty-cycle control register 760. The output of each AND gate in the array 714 is provided to an input of the eight-input OR gate 718. The output of the OR gate 718 is designated as the duty-cycle controlled transformer driver signal DIB_N.

Setting one or more of the outputs P1–P8 of the duty-cycle control register 740 to a logic high level results in a digital wave form for the transformer driver signal DIB_P which reflects the selected pattern of control signals P1–P8. For example, wave form 740a reflects a pattern combination wherein P=HIGH, while P2–P8=LOW. Wave forms 740b, 740c and 740d similarly result from other combinations of control signals P1–P8.

Likewise, setting one or more of the outputs N1–N8 of the duty-cycle control register 760 to a logic high level results in a digital wave form for the transformer driver signal DIB_N which reflects the selected pattern of control signals N1–N8. For example, wave form 760c reflects a pattern combination wherein N1=N2=N3=LOW, N4=N5=N6= HIGH, while N7=N8=LOW. Wave forms 760a, 760b and 760d similarly result from other combinations of control signals P1–P8.

The circuitry of FIG. 7 has substantial flexibility in that the transformer driver signals DIB_P and DIB_N can be shifted with respect to each other via appropriate settings in the duty-cycle control registers 740 and 760. For example, the transformer driver signal DIB_P can be selected to lead, lag, or overlap the transformer driver signal DIB_N, and vice-versa. Furthermore, the duty cycle of each transformer driver signal DIB_N and DIB_P can be selected independently, permitting optimization of efficiency in the transformer driver.

If the base duty cycle of the waveform 710 is to be decreased from 6.25% for higher resolution, the circuit design may remain essentially the same except that the synchronous counter 700 and NOR gate 702 may be increased in size to generate a lower base duty cycle. For example, to obtain a base duty cycle of $1/128$th, equivalent to approximately 0.78% duty cycle steps, counter 700 would be increased to eight bits and NOR gate 702 to eight inputs. It is further contemplated that counter 700 can be asynchronous, provided that a D-type flip-flop is added at the output of NOR gate 702, with a clock signal shifted by one-half clock cycle (inverted) with respect to the master clock. As will be recognized by those skilled in the art, numerous other circuit topologies could be utilized to implement independent duty cycle control for transformer driver signals DIB_P and DIB_N.

FIG. 8 is a schematic diagram providing exemplary details of alternate transformer driver circuitry capable of being programmed to adjust power transfer in accordance with the present invention. In this embodiment of the invention, the transformer 400 is driven by a single-ended transformer driver signal provided at the output of a comparator 812. The single-ended transformer driver signal controls the gate of an external transistor 800 having a drain node connected to one side of the primary side of the transformer 400, and a source node connected to a system side ground reference. The opposing side of the primary side of the transformer 400 is connected to a power supply VCC of the system side, such that current flows through the primary side of the transformer 400 during periods in which the transistor is turned on. The charging phase of the transformer 400 occurs when the transistor 800 is on, while the discharging phase of the transformer 400 occurs when the transistor 800 is off. Current does not flow on the secondary during the charge phase (the transformer polarity is reversed in FIG. 8), and therefore this configuration is efficient for reasons discussed above. Furthermore, during the discharge phase power is only delivered to the load on the secondary and is not returned to the power supply through the primary drivers as in the differential configuration. Nevertheless, the single-ended configuration provides improved efficiency over prior solutions.

In this embodiment of the invention, an analog duty-cycle control circuit is used to generate the control signal to the transistor 800. More specifically, a resistor 806 and capacitor 808 are coupled in series between the power supply VCC and ground node GND of the system side. The voltage established at the common node 811 is provided to one input of a comparator 804 with hysterisis. The voltage at node 811 is compared to an internal reference voltage VREF provided to the other input of the comparator 804. When the reference voltage VREF is exceeded by the voltage at node 811, the comparator 804 output transitions to a logic high state. This output is provided to the gate of a transistor 810 coupled between the node 811 and the ground of the system side, such that the transistor 810 turns on in response to a logic high signal. While on, the transistor 810 functions to discharge the capacitor 808, eventually causing voltage at the node 811 to be less than the reference voltage VREF. The output of the comparator 804 then returns to a logic low level. At this point, the resistor 806 begins to recharge the capacitor 808, and the process is repeated. The result is a "sawtooth"-like signal at the node 811. This signal is provided to one input of the comparator 812. The voltage at node 811 may be configured to have an extremely low duty cycle, with the frequency tolerance determined by the resistor 806 and capacitor 808, the equivalent resistance of the transistor 810, and the hysterisis of the comparator 804. An additional resistor (not shown) may be provided to permit adjustments to the hysterisis of the comparator 804.

A programmable voltage level is provided to the other input of the comparator 812. The programmable voltage reference 814 is controlled by a 5 bit output controller 818 with an associated logic decoder 816. The outputs DC0–DC31 of the logic decoder 816 control a bank of switches 820 used to selectively couple various points of the programmable reference 814 to an input of the comparator 812. In this embodiment of the invention, the programmable reference 814 is configured as a resistor divider having various tap points. The sawtooth-like waveform at node 810 is compared to the voltage at a selected tap point, resulting in a signal at the output of comparator 812 having a variable duty cycle based upon the voltage reference selected by the duty cycle register 818. Alternatively, a programmable duty cycle circuit such as that described above could be used as a control signal to the gate of the transistor 800.

The high voltage isolation barrier 102 of FIG. 8 may include a capacitor 830 for communicating voltage measurement data from the system side circuitry 104 to the line side circuitry 100. One or more data path capacitors 832 are also included in the high voltage isolation barrier 102. A capacitor 834 is also provided as discussed above to provide a common ground reference between the system side circuitry 102 and the line side circuitry 100. Alternatively data can be transmitted differentially using two capacitors across the high voltage isolation barrier 102, or via a second transformer.

Thus, an efficient method and circuitry have been described for efficiently transferring various levels of power across a high-voltage isolation barrier. The amount of power transferred may be adjusted to account for variations in the amount of current required by the line side circuitry and to mitigate inefficiencies associated with the isolation barrier.

In view of the above detailed description of the present invention and associated drawings, other modifications and variations will now become apparent to those skilled in the art. It should also be apparent that such other modifications and variations may be effected without departing from the spirit and scope of the present invention.

We claim:

1. A method for transferring power across an isolation barrier having a system side and a line side, the line side having a voltage measurement circuit and the line side of the isolation transformer having first and second input nodes, the method comprising:

transferring power from the system side to the line side of the isolation barrier;

measuring a resulting line side voltage;

transferring the measured line side voltage from the line side to the system side; and adjusting the amount of power transferred to the line side based upon the measured line side voltage;

wherein the step of transferring power comprises:
      providing a first pulse signal to the first input node;
      providing a second pulse signal to the second input node; and
      the second pulse signal being delayed with respect to the first pulse signal;
      wherein the first pulse signal and the second pulse signal are repeated at a predetermined frequency, and wherein the step of adjusting the amount of power transferred to the line side comprises selectively varying the duty cycle of the repeated first and second pulse signals.

2. A method for transferring power across an isolation barrier having a system side and a line side, the line side having a voltage measurement circuit and the line side of the isolation transformer having first and second input nodes, the method comprising:

transferring power from the system side to the line side of the isolation barrier;

measuring a resulting line side voltage;

transferring the measured line side voltage from the line side to the system side; and adjusting the amount of power transferred to the line side based upon the measured line side voltage;

wherein the step of transferring power comprises:
        providing a first pulse signal to the first input node;
    providing a second pulse signal to the second input node; and
        the second pulse signal being delayed with respect to the first pulse signal;
        wherein the first pulse signal and the second pulse signal are repeated at a predetermined frequency, and wherein the step of adjusting the amount of power transferred to the line side comprises selectively varying the predetermined frequency.

3. A method for transferring power across an isolation barrier having a system side and a line side, the line side having a voltage measurement circuit, comprising:

transferring power from the system side to the line side of the isolation barrier, wherein the isolation barrier comprises an isolation transformer;

measuring a resulting line side voltage; and adjusting the amount of power transferred to the line side based upon the measured line side voltage;

wherein the line side of the isolation transformer has first and second input nodes and the step of transferring power comprises:

providing a first pulse signal to the first input node;
        providing a second pulse signal to the second input node; and
        the second pulse signal being delayed with respect to the first pulse signal,
        wherein the first pulse signal and the second pulse signal are repeated at a predetermined frequency, and wherein the step of adjusting the amount of power transferred to the line side comprises selectively varying the duty cycle of the repeated first and second pulse signals.

4. A method for transferring power across an isolation barrier having a system side and a line side, the line side having a voltage measurement circuit, comprising:

transferring power from the system side to the line side of the isolation barrier, wherein the isolation barrier comprises an isolation transformer;

measuring a resulting line side voltage; and adjusting the amount of power transferred to the line side based upon the measured line side voltage;

wherein the line side of the isolation transformer has first and second input nodes and the step of transferring power comprises:

providing a first pulse signal to the first input node;
        providing a second pulse signal to the second input node; and
        the second pulse signal being delayed with respect to the first pulse signal,
        wherein the first pulse signal and the second pulse signal are repeated at a predetermined frequency, and wherein the step of adjusting the amount of power transferred to the line side comprises selectively varying the predetermined frequency.

\* \* \* \* \*